US008620293B2

(12) United States Patent
Krinsky

(10) Patent No.: US 8,620,293 B2

(45) Date of Patent: Dec. 31, 2013

(54) LOCATION-BASED TRANSMITTER SELECTION AND HANDOFF

(75) Inventor: Jeffrey A. Krinsky, Woodinville, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 720 days.

(21) Appl. No.: 12/142,643

(22) Filed: Jun. 19, 2008

(65) Prior Publication Data

US 2008/0248743 A1 Oct. 9, 2008
US 2009/0280741 A2 Nov. 12, 2009

Related U.S. Application Data

(63) Continuation-in-part of application No. 11/227,972, filed on Sep. 15, 2005.

(51) Int. Cl.
*H04M 3/00* (2006.01)

(52) U.S. Cl.
USPC ........ 455/418; 455/419; 455/403; 455/550.1; 455/575.9; 455/90.1; 455/90.3

(58) Field of Classification Search
None
See application file for complete search history.

(56) References Cited

U.S. PATENT DOCUMENTS

| | | | | |
|---|---|---|---|---|
| 5,446,492 | A | 8/1995 | Wolf et al. | 348/192 |
| 5,734,422 | A | 3/1998 | Maurer et al. | 348/184 |
| 5,940,471 | A | 8/1999 | Homayoun | 379/10.03 |
| 6,055,015 | A | 4/2000 | Edwards | 348/192 |
| 6,246,435 | B1 | 6/2001 | Patel | 348/192 |
| 6,259,477 | B1 | 7/2001 | Hu | 348/180 |
| 6,463,265 | B1 * | 10/2002 | Cohen et al. | 455/186.1 |
| 6,496,221 | B1 | 12/2002 | Wolf et al. | 348/192 |
| 6,522,888 | B1 * | 2/2003 | Garceran et al. | 455/456.3 |
| 6,678,424 | B1 | 1/2004 | Ferguson | 382/286 |
| 2001/0016488 | A1 | 8/2001 | Haymes et al. | |
| 2003/0040272 | A1 * | 2/2003 | Lelievre et al. | 455/3.06 |
| 2003/0041056 | A1 | 2/2003 | Bossemeyer et al. | 707/3 |
| 2004/0172323 | A1 | 9/2004 | Stamm | |
| 2004/0176040 | A1 | 9/2004 | Thornton et al. | |
| 2005/0272437 | A1 * | 12/2005 | Ritter et al. | 455/452.2 |
| 2006/0002540 | A1 | 1/2006 | Kreiner et al. | 379/265.02 |
| 2006/0046749 | A1 | 3/2006 | Pomerantz et al. | |
| 2006/0073786 | A1 | 4/2006 | Sarkar | 455/24 |
| 2006/0087409 | A1 | 4/2006 | Korzeniowski | |
| 2006/0203738 | A1 | 9/2006 | Fok et al. | |
| 2006/0227944 | A1 | 10/2006 | Paden et al. | |
| 2006/0262793 | A1 * | 11/2006 | Vare et al. | 370/390 |

OTHER PUBLICATIONS

Hall, T.A., "Objective Speech Quality Measures for Internet Telephony", National Institute of Standards and Technology, year not available, 9 pages.

* cited by examiner

*Primary Examiner* — Kashif Siddiqui
*Assistant Examiner* — Sayed T Zewari
(74) *Attorney, Agent, or Firm* — Woodcock Washburn LLP

(57) ABSTRACT

An automatic radio station tuning control system senses when a mobile radio receiver is leaving the coverage area of the transmitter that is transmitting program content, and entering the coverage area of another transmitter that is transmitting the same program content. The program content can be from a radio station, a mobile internet application, or the like. The mobile radio performs re-tuning to the other transmitter in order to continue to receive the program content even though the mobile radio is leaving the coverage area of the first transmitter. The tuning control system can provide uninterrupted coverage to a listener of a radio when the radio receiver is, for example, in a vehicle traversing a mountainous area, or when the radio receiver is moving from one WiFi hot spot to another.

20 Claims, 3 Drawing Sheets

LOCATION-BASED TRANSMITTER SELECTION AND HANDOFF

CROSS-REFERENCE TO RELATED APPLICATIONS

This application is a continuation-in-part of U.S. patent application Ser. No. 11/227,972 filed Sep. 15, 2005, now U.S. Pat. No. 8,396,468 issued on Mar. 12, 2013, and is incorporated by reference herein in its entirety.

TECHNICAL FIELD

The technical field relates in general to radio communications. More particularly, the technical field relates to an automatic tuner which tracks program content in a mobile radio.

BACKGROUND

It is not uncommon, when listening to a radio while in a vehicle, for the radio signal to be intermittently lost. For example, when traveling around a mountainous area, a radio signal can be lost until the vehicle moves into an area where there is no blockage of the radio signal by the mountains. It is common that the same program content is transmitted by different transmitting stations/towers located on different sides of the mountain to accommodate different listening audiences. However, unless the person in the vehicle knows of the alternate transmitting station and knows to which frequency to tune, the occupant of the vehicle will not be able to listen to the content as she is traversing the obstacle.

In a different but related scenario, a person traveling in a vehicle, such as a bus, train, car, plane, or boat may travel so much that she would be unable to listen to program content of a favorite radio station because the vehicle movement takes the listener away from the finite range of the transmitting station. If the program content is carries by an affiliate radio station in an adjoining area, then the listener may be able to manually retune her radio receiver to the new frequency if she were aware of the affiliate station and its differing frequency.

SUMMARY

A method of switching received broadcasts in a mobile radio receiver includes receiving a first broadcast on a first frequency from a first radio transmitter while the mobile radio is traversing the coverage area of the first transmitter. The broadcast from the first transmitter is received and demodulated by the radio receiver and audio output is provided to the listener. The mobile radio then identifies a second broadcast on a second frequency from a second radio transmitter that is transmitting the same or similar program content. The identified second transmitter broadcast signal is measured and compared to the signal of the first transmitter broadcast signal. If the quality of the signal of the second radio transmitter is better than the quality of the signal of the first radio transmitter, then the radio switches from the first signal to the second signal in order to continue to provide the program content to the listener.

The mobile radio advantageously uses the location of the mobile radio in a search to determine which radio station transmitters are in the vicinity of the mobile radio as it travels. A database look-up is used to identify radio station transmitter locations and tuning information, such as frequencies, that contain compatible program content being transmitted at the same time as a first transmitter. The database may be local or remotely networked. If the database is remotely networked, it may be available via a cellular network that can provide both the location information as well as the database look-up information.

In an example embodiment, look-up information is provided to the mobile radio, in the form of a nearest neighbor list or the like. This information can be provided as metadata. The metadata can include tuning information for other stations, geographic information pertaining to other stations, coverage of nearby transmitters, or a combination thereof. The metadata can be provided in a sub carrier transmission, in a separate transmission, encoded within a transmission (e.g., in the case of a digital transmission), or the like.

Figure 1:
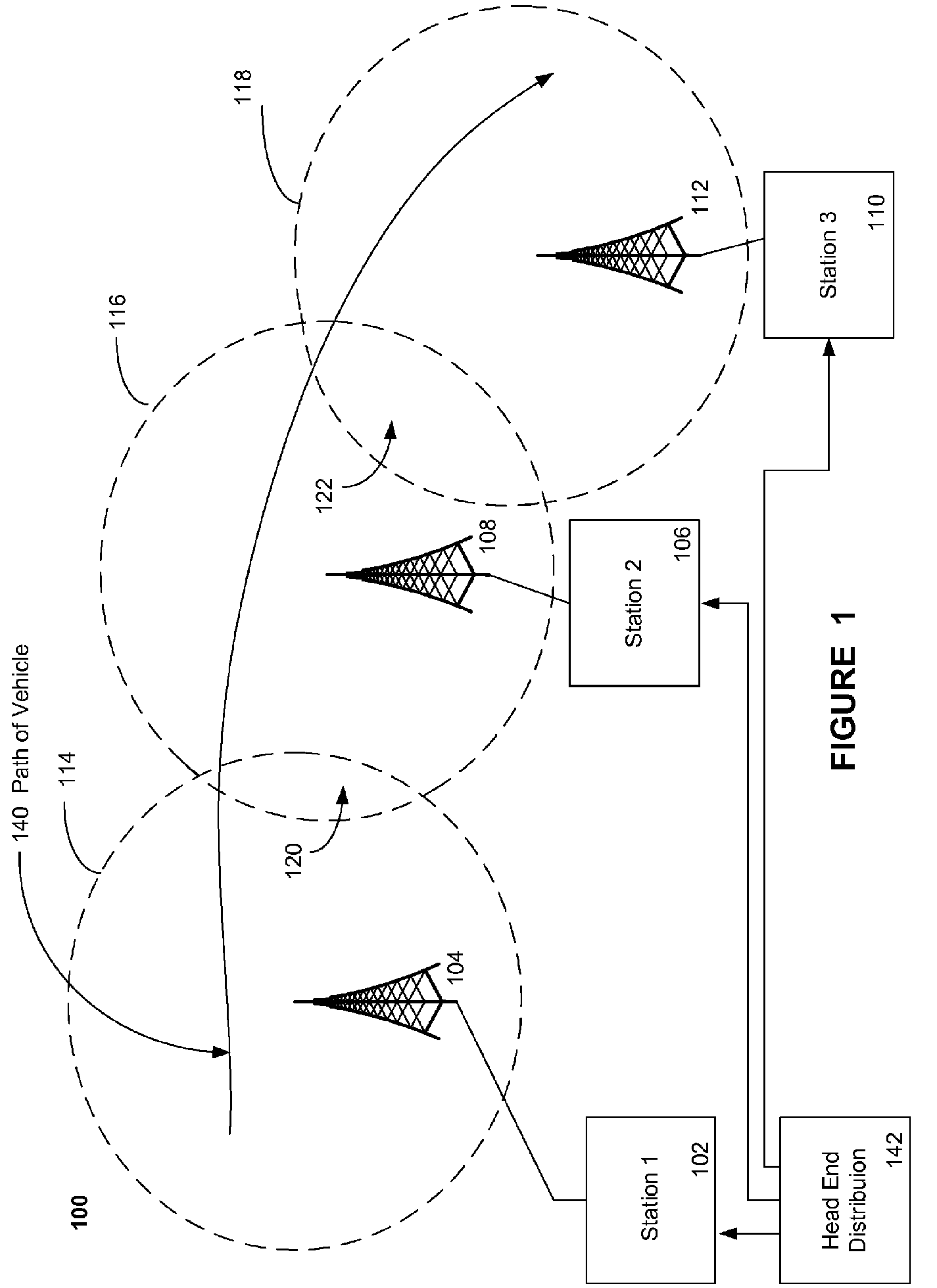
FIG. 1 is a diagram showing a typical example of an environment in which location based transmitter selection and handoff can be practiced.

In the drawings, the same reference numbers identify identical or substantially similar elements or acts. To facilitate the discussion of any particular element or act, the most significant digit or digits in a reference number refer to the figure number in which that element is first introduced (e.g., element 204 is first introduced and discussed with respect to FIG. 3).

DETAILED DESCRIPTION OF ILLUSTRATIVE EMBODIMENTS

Location based transmitter selection and handoff is described with respect to various embodiments. The following description provides specific details for a thorough understanding of, and enabling description for, these embodiments of the invention. However, one skilled in the art will understand that the invention may be practiced without these details. In other instances, well-known structures and functions have not been shown or described in detail to avoid unnecessarily obscuring the description of the embodiments of the invention.

It is intended that the terminology used in the description presented be interpreted in its broadest reasonable manner, even though it is being used in conjunction with a detailed description of certain specific embodiments of the invention. Certain terms may even be emphasized below; however, any terminology intended to be interpreted in any restricted manner will be overtly and specifically defined as such in this Detailed Description section.

Representative Environment

FIG. 1 represents a typical environment 100 in which the elements of location based transmitter selection and handoff can be practiced. A traveler may traverse geography along a path of the vehicle 140 in which she is traveling. The path may traverse multiple coverage areas for radio transmitters. For example, in FIG. 1, transmitter 104 has coverage area 114, transmitter 108 has coverage area 116, and transmitter 112 has coverage area 118. The coverage areas 114, 116, and 118 may have one or more overlap areas 120 and 122 where two or more coverage areas co-exist.

It is common that a syndicated radio program is transmitted on many different radio stations simultaneously. For example, a radio program having a specific daily content may be transmitted from a content provider via a head end distribution point 142 to a first radio station 102, a second radio station 106, and a third radio station 110. Although only three stations are shown, it is well understood that a large plurality of such radio stations is possible.

A traveler listening to a program in a vehicle, traverses from the coverage area 114 of the first station 102 approaches the coverage area 116 of the second station 106. At the intersection 120 of coverage areas 114 and 116, the signal strength of the program from the first station 102 decreases as a function of distance and/or channel quality from the transmission tower 104. Also, the signal strength from transmission tower 108 increases as the traveler approaches tower 108. At area 120, signals from tower 104 and tower 108 are present. Normally, transmitting stations in adjacent areas employ different operational frequencies to avoid interference in any multiple coverage zones such as 120. Therefore, if the traveler following the path 140 is listening to program content from station 102 via transmitter tower 104, she will loose reception when she exits coverage area 114 and enters coverage area 116 unless she changes frequency reception settings on her mobile radio receiver in the vehicle.

According to the herein described location based transmitter selection and handoff, overlap area 120 provides an opportunity to detect affiliate station 106 of area 116, and change the tuning frequency of the mobile radio such that no program content is missed by exiting coverage area 114 and entering coverage area 116. In one aspect of the invention, when in a location where two or more transmitters have overlapping coverage areas, a multiple receiver radio (a radio configured to receive more than one carrier frequency either concurrently or one at a time) can determine which alternate transmitter carries the same content as the currently received content from a first radio transmitter. Then, as the signal quality becomes better, the multiple receiver radio can switch to the alternate transmitter to accommodate moving from one coverage area to another. Signal quality can be determined in any appropriate manner. For example, signal strength can be determined, signal-to-noise ration can be determined, distortion can be determined, frequency locked can be determine, or a combination thereof.

Figure 2:
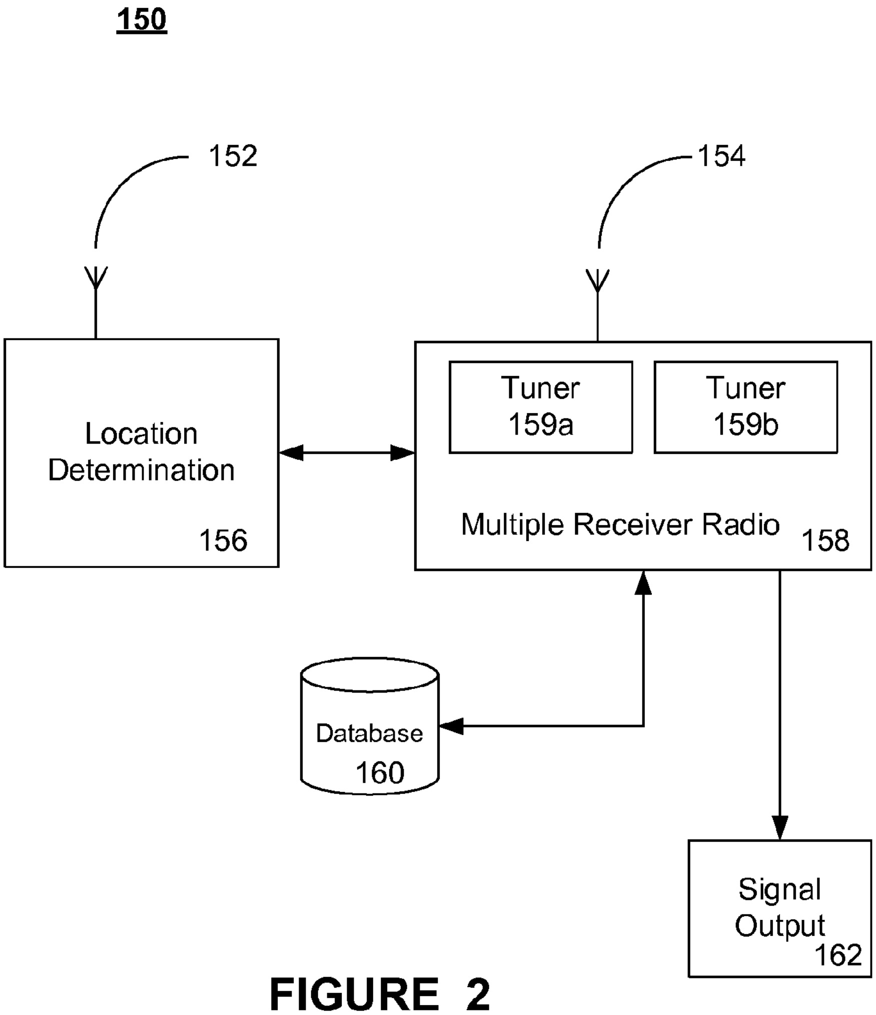
FIG. 2 is a block diagram showing an example block diagram of a mobile radio device.

FIG. 2 depicts an example embodiment capable of using location based transmitter selection and handoff. In FIG. 2, a multiple receiver radio 158 is capable of simultaneously, or individually, receiving radio transmissions on different frequencies using either one antenna or an array of antennas 154. Multiple receiver radio 158 may be configured with one tuner or two or more independent tuners, such as tuners 159*a* and 159*b*. When configured with at least two independent tuners 159*a* and 159*b*, a first tuner, such as tuner 159*a*, may receive and process program content from one radio transmitter while a second tuner, such as tuner 159*b*, may receive and measure signal strength from an alternate radio transmitter. The radio 158 produces an audio signal output 162 from one of the many transmitters that it receives. In operation, the radio 158, when tuned to a specific frequency, begins a search for the same or substantially similar content that is being transmitted by a second or alternate transmitter of a radio station. In one example embodiment, the search is performed by accessing a database 160 that associates content with multiple frequencies of different radio transmitter stations that carry that content.

Although the herein description is with respect to tuning a radio to a specific frequency, it is to be understood that tuning includes other types of tuning such as tuning of digital transmissions and/or spatial tuning, for example. Tuning can refer to tuning to an appropriate IP address, tuning can refer to tuning a receiver in another direction (e.g., via beamforming, physical position, etc.), or a combination thereof, for example.

In another example embodiment, information indicating which stations are providing the same or substantially the similar content is transmitted to the radio 158 in the form of metadata. The information can be in the form of a list, or the like, indicating which stations are providing the similar content, the carrier frequencies of the stations, and/or locations of the stations. The metadata can include tuning information for other stations, geographic information pertaining to other stations, coverage of nearby transmitters, or a combination thereof, for example. The metadata can be provided in a sub carrier transmission, in a separate transmission, encoded within a transmission (e.g., in the case of a digital transmission), or the like, to the radio 158. Thus, the metadata could provide a list of potential stations from which to choose, and the radio 158 can select from the list.

A location determination device 156 may be used in conjunction with the multiple radio receiver. In an example configuration, the device 156 is co-located with the radio 158 so as to determine the location of the radio. For example, if the radio 158 is traveling in an automobile, then the location of the radio may be ascertained using the location determination device 156. In an example embodiment, the location determination device 156 may be integrated into the radio 158.

In one aspect of the invention, the location determination device can receive location signals via antenna 152. In example embodiments, the location determination device can be one of a global positioning system (GPS) receiver/processor, a cellular-based system, or a combination thereof. If the location determination device 156 is a cellular-based system, then the device can operate using any of time delay of arrival (TDOA) and angle of arrival (AOA), round trip time (RTT) or a combination thereof. Assisted GPS (AGPS) is also available where the GPS spacecraft ephemeris, or the like, is available via a cellular system along with the GPS spacecraft signals. As is known by one skilled in the art, once the location determination device 156 is provided with TDOA or AOA, or GPS, or AGPS information, the location of the radio may be determined.

In joint operation, the radio 158 can access the database 160 to determine different frequencies to scan that likely have similar or the same content as that which is currently being received and processed to an audio output by the radio. The location device 156 supplies location information to the radio, or to the database 160. Location information is valuable here because the location information may be used, along with a station or frequency identifier, to identify candidate alternative radio stations and their respective frequency of operation that have similar content to the presently received audio information. Once location and possible frequency are known, the radio 158 can scan for those frequencies and take signal quality measurements. Such signal quality measurements can be any indication of signal strength, signal to noise ratio, carrier to noise ratio, amplitude measurements in a bandwidth of interest for the selected transmitter, distortion measurements, or a combination thereof. The signal quality measurements, radio location, and station or program content identifier can be saved in the database 160 for future reference. Thus, on future searches, the content identifier can be correlated to the location of the radio and alternative radio transmitter frequencies can be identified as alternatives to the currently received transmitter program content signals.

In one embodiment, the database 160 is populated with all radio frequencies providing the similar content for various geographic areas. The signal quality of the alternative radio transmitter frequencies is monitored, by the radio 158, during signal reception. If the signal quality degrades below a predetermined level, the radio 158 automatically switches to an appropriate alternate station in accordance with the information in the database 160. In alternative embodiments, the database 160 of frequencies and content for geographic areas can be stored in the radio, on a network, or combination thereof. If the database is available via a radio link, then an appropriate RF communication port or Internet access port may be available to the radio 158 in order to access the networked database. In another embodiment, not specifically shown in FIG. 2, the database may be a networked database and the location determination equipment 156 contains the above-mentioned RF port from which location information as well as database information is available via a cellular network or satellite network interface via antenna port 152.

In an embodiment in which the signals received from multiple diversely located transmitters are digital in format, then, in an overlap coverage area, such as 120 or 122 in FIG. 1, then the signals from at least two of the digital transmitting stations can be combined digitally to produce higher quality (lower bit error) signal that the radio 158 can use to deliver to the output 162. The above described technique of combining signals having the same content from different sources is well known to those of skill in the art and is one solution to the well appreciated problem of digital multipath.

Figure 3:
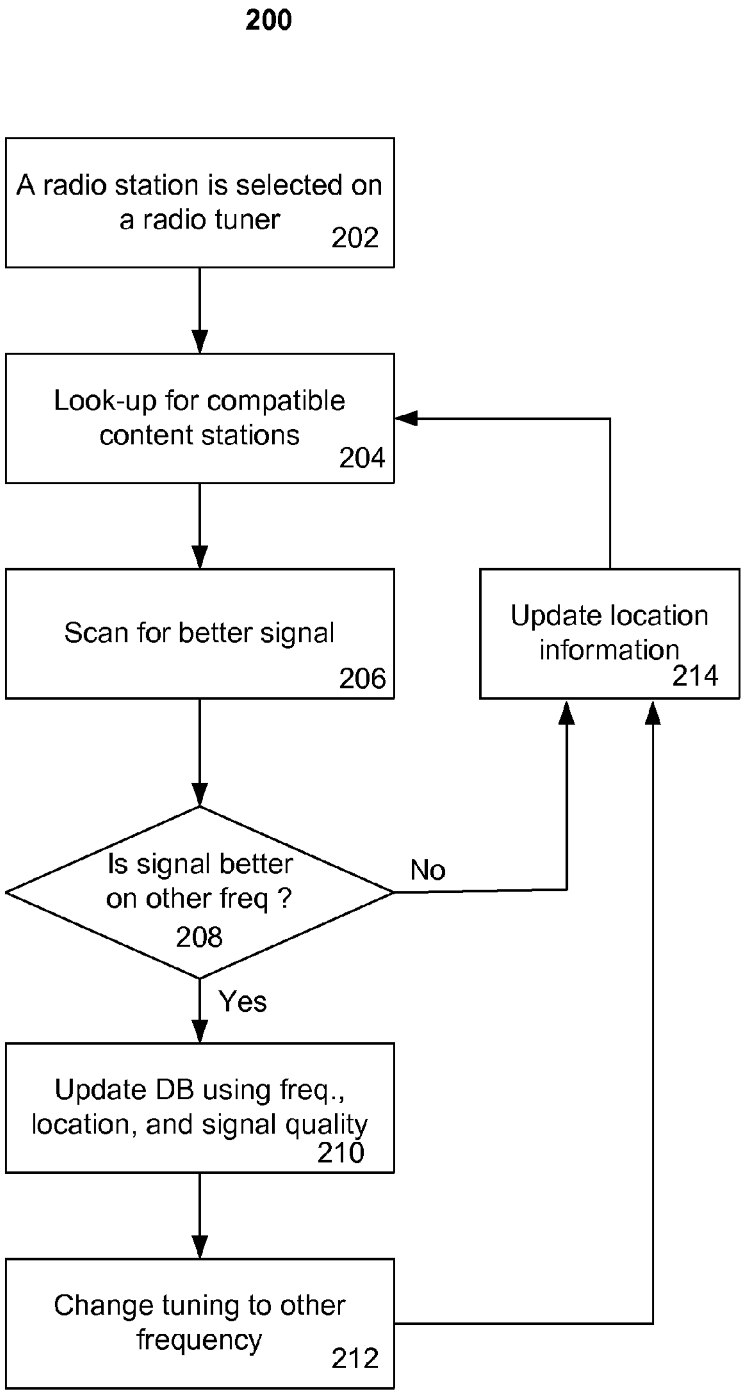
FIG. 3 is a flow diagram showing an example method for location based transmitter selection and handoff.

FIG. 3 is a flow diagram showing an example method 200 of using aspects of the invention. The method begins when a radio station is selected on a radio tuner at step 202. In an example embodiment, this involves making a selection of RF frequency corresponding to a radio station transmission having program content. The program content can be output to an audible interface for a user. According to aspects of location based transmitter selection and handoff, a look-up for radio stations that are transmitting the same or similar (compatible) program content is then performed at step 204. Such stations can be repeater radio stations or such stations can be syndicated stations that carry the same program content at roughly the same time. As indicated above, this look-up can be performed using a database search or a network access to a remote database.

As an alternative to a database look-up, other methods of finding alternative transmitters having compatible program content include a subcarrier channel transmitted by the broadcast radio transmitting station along with its main carrier.

As an additional advantage to a database look-up, an alternate transmitter look-up can proceed with knowledge of the location of the receiving radio receiver. Thus, only alternative radio stations that are within a local geographical proximity can be selected as results from the look-up.

The database look-up results in a list of possible alternative radio stations that is receiving audio program content. At step 206, the alternative radio station frequencies are scanned to find a signal that is of better quality (higher amplitude, S/N, C/N, signal quality, minimal distortion, etc.) than the presently received radio station signal that is provided to the audio output of the radio. At step 208, a decision is made if the scanned frequency is of better signal quality than the presently demodulated signal that is driving the audio output of the radio. If the scanned quality is not of higher quality, then the process moves to step 214 where location information of the radio is updated. In an example embodiment, this step can be delay for some time to allow the radio, presumably traveling in a vehicle, to traverse an additional distance. After the location information is updated, a new look-up can be performed at step 204 and a next scan can be performed of the available alternative radio transmitter signals at step 206. At some point along the travel, the scanned signal is of higher quality than the currently demodulated signal and the process moves from step 208 to step 210.

The new signal location, frequency of the scanned signal, and program content identifier are stored in the database at step 210. Since the scanned signal quality is greater than that of the presently demodulated signal, it is assumed that the mobile radio is approaching the newly scanned signal coverage area and departing the coverage area of the presently demodulated signal which may be waning in signal quality. Thus, the radio moves to select the new, alternative radio station transmission for demodulation. This selection occurs at step 212 where the new radio station frequency and signal are now demodulated and used to drive the audio output of the radio.

As a result of the switching, the listener receives the benefit of being able to continue to listen to her program content without having to find a new radio station that carries the same content at the same time that is within the local receiving signal area. After switching at step 212, the method 200 may update the location information of the radio at step 214 and repeat the cycle of looking for alternative radio stations that carry the same program content as the presently demodulated signal by moving back to step 204. From here, as the listener with the radio travels across multiple coverage areas, the program content may be maintained by automatically changing the tuning on the radio to compatible program content carrying radio stations.

Returning to FIG. 2, in one aspect of location based transmitter selection and handoff, the location information input into the location device 156 may be provided by any number of different cellular systems that can supply location data and also supply database information concerning affiliate, syndicated, or other compatible program content radio stations, locations, and frequencies. It is understood that any presently known or future cellular system can supply the location and database information requested of the radio.

The above detailed description of embodiments of location based transmitter selection and handoff is not intended to be exhaustive or to limit the invention to the precise form disclosed above. While specific embodiments of, and examples for, location based transmitter selection and handoff are described for illustrative purposes, various equivalent modifications are possible within the scope of location based transmitter selection and handoff, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times. Where the context permits, words in the above Detailed Description using the singular or plural number may also include the plural or singular number, respectively.

The teachings of location based transmitter selection and handoff provided herein can be applied to other systems, not necessarily the system described herein. The elements and acts of the various embodiments described above can be combined to provide further embodiments. Aspects of location based transmitter selection and handoff can be modified, if necessary, to employ the systems, functions, and concepts of the various related technologies to provide yet further embodiments of location based transmitter selection and handoff.

These and other changes can be made to location based transmitter selection and handoff in light of the above Detailed Description. While the above description details certain embodiments of location based transmitter selection and handoff and describes the best mode contemplated, no matter how detailed the above appears in text, location based transmitter selection and handoff can be practiced in many ways. As noted above, particular terminology used when describing certain features or aspects should not be taken to imply that the terminology is being redefined herein to be restricted to any specific characteristics, features, or aspects of location based transmitter selection and handoff with which that terminology is associated. In general, the terms used in the following claims should not be construed to limit location based transmitter selection and handoff to the specific embodiments disclosed in the specification, unless the above Detailed Description section explicitly defines such terms. Accordingly, the actual scope of location based transmitter selection and handoff encompasses not only the disclosed embodiments, but also all equivalent ways of practicing or implementing location based transmitter selection and handoff under the claims.

Location based transmitter selection and handoff can be utilized in various applications, such as, for example, mobile internet applications. For example, location based transmitter selection and handoff can be used to enable handoff between wireless, e.g., WiFi (802.11x, and others), access points for applications including voice of internet protocol (VoIP), video over internet protocol, two way picture phones, web browsing, email, file transfer protocol (FTP) data, multiplayer games, or the like. Thus, providers can provide program content via a wireless access points (e.g., WiFi access points). The program content can comprise VoIP, video over IP, an image from or to a picture phone, web content, data being provided via a FTP, game data, or the like. When the quality of the program content starts to degrade, the program content can be obtain from the next appropriate wireless access point. The quality of the program content can include a determination of signal strength of the program content broadcast via a wireless access point, a determination of signal to noise ratio of the program content broadcast via a wireless access point, a determination of distortion of the program content broadcast via a wireless access point, a determination of carrier to noise ratio of the program content broadcast via a wireless access point, or an amplitude measurement in a bandwidth of interest of the program content broadcast via a wireless access point. Also, assessing the quality can include comparing values to threshold values. For example, assessing quality can include comparing the signal strength of the program content broadcast via a wireless access point to a threshold value of signal strength, comparing the signal to noise ratio of the program content broadcast via a wireless access point to a threshold value of signal to noise ratio, comparing a measure of distortion of the program content broadcast via a wireless access point to a threshold value of a measure of distortion, and/or comparing the signal amplitude of the program content broadcast via a wireless access point to a threshold value of signal amplitude.

While certain aspects of the invention are presented below in certain claim forms, the inventors contemplate the various aspects of the invention in any number of claim forms. For example, while only one aspect of the invention is recited as embodied in a computer-readable medium, other aspects may likewise be embodied in a computer-readable medium. Accordingly, the inventors reserve the right to add additional claims after filing the application to pursue such additional claim forms for other aspects of the invention.

What is claimed:

1. A method of switching received broadcasts in a mobile receiver, the method comprising:

receiving, on a mobile receiver in motion, a first broadcast from a first transmitter, wherein the first broadcast has program content that is processed and provided as an audio output of the mobile radio receiver;

receiving, on the mobile receiver, metadata comprising a plurality of geographical locations and carrier frequencies, wherein each geographical location and carrier frequency is associated with one of a plurality of transmitters;

storing the metadata in a database configured in the mobile receiver;

identifying, based on the metadata stored in the database configured in the mobile receiver, a second broadcast from a second transmitter that is transmitting the program content;

measuring a signal quality of the second transmitter while continuing to process and provide the program content of the first transmitter, wherein the mobile receiver comprises two independent tuners, wherein a first tuner of the two independent tuners receives and processes the program content while a second tuner of the two independent tuners receives and measures the signal quality from the second transmitter;

storing a measurement of the signal quality of the second transmitter in the database;

determining that the signal quality of the second transmitter is better than a signal quality of the first transmitter; and switching to the second broadcast in order to process and provide the program content from the second transmitter to the mobile radio receiver.

2. The method of claim 1, wherein:

the program content of the first broadcast is provided as an audio output of the mobile receiver; and switching from to the second broadcast results in the audio output being provided from the second transmitter instead of from the first transmitter.

3. The method of claim 2, wherein switching to the second broadcast in order to process and provide the program content from the second transmitter to the mobile receiver comprises using the first broadcast and the second broadcast in digital combination to provide the program content to the audio output of the mobile receiver.

4. The method of claim 3, further comprising:

using only the second broadcast to provide program content when a signal quality of the first transmitter drops below a pre-defined threshold.

5. The method of claim 1, further comprising:

determining a present location of the mobile receiver; and updating the database with information concerning at least one of the present location, a signal quality of the second transmitter, and the second broadcast.

6. The method of claim 1, wherein identifying the second broadcast from the second transmitter that is transmitting the program content comprises:

determining a present location of the mobile receiver; and searching in a database for stations having the program content of the first transmitter within a receive radius of the present location.

7. The method of claim 6, wherein determining the present location comprises using at least one of a GPS receiver processor, an assisted GPS system, and a cellular service provider based location determination system.

8. The method of claim 7, wherein the cellular service provider based location determination system comprises at least one of a time delay of arrival system and an angle of arrival system.

9. The method of claim 1, wherein identifying, in the database configured in the mobile receiver, the second broadcast from the second transmitter that is transmitting the program content comprises:

searching in the database for a transmitter transmitting the program content of the first broadcast.

10. The method of claim 1, wherein receiving the metadata comprises receiving a subcarrier signal comprising the metadata.

11. A system for automatically switching radio receive frequencies on a mobile radio receiver to maintain program content, the system comprising:

a mobile radio;

a database, configured in the mobile radio, of radio transmitter locations, frequencies, and program content associations;

a location determination device located proximate to the mobile radio providing location information of the mobile radio;

wherein the mobile radio populates the database using received metadata comprising a plurality of geographical locations and carrier frequencies, wherein each geographical location and carrier frequency is associated with one of a plurality of transmitters, wherein the mobile radio searches the database for an alternate radio transmitter location, alternate radio transmitter frequency, and program content compatible with program content associated with a currently selected radio transmitter frequency, wherein the alternate radio transmitter location is within a pre-defined distance from the mobile radio, wherein the mobile radio measures a signal strength at the alternate radio transmitter frequency and switches the currently selected radio frequency to the alternate radio transmitter frequency when the measured signal strength exceeds a threshold, wherein the mobile radio stores a measurement of the signal strength of the alternate radio transmitter frequency in the database, and wherein the mobile radio comprises at least two independent tuners, wherein a first tuner of the at least two independent tuners receives and processes the program content while a second tuner of the at least two independent tuners receives and measures a signal strength from the alternate radio transmitter.

12. The system of claim 11, further comprising an audio output of the mobile radio configured to render audio of the program content.

13. The system of claim 11, wherein the location determination device located proximate to the mobile radio provides a present location of the mobile radio using one of a GPS location system and a cellular wireless location determination system.

14. The system of claim 13, wherein the cellular wireless location determination system comprises one of a time delay of arrival location system and an angle of arrival location system.

15. The system of claim 11, wherein the metadata is provided wirelessly by one of a cellular service provider and an internet service provider.

16. A method of switching received broadcasts in a mobile radio receiver, the method comprising:

receiving, on a mobile receiver in motion, a first broadcast from a first provider, wherein the first broadcast comprises program content;

receiving, on the mobile receiver, metadata comprising a plurality of geographical locations and carrier frequencies, wherein each geographical location and carrier frequency is associated with one of a plurality of providers;

storing the metadata in a database configured in the mobile receiver;

identifying, based on the metadata stored in the database configured in the mobile receiver, a second broadcast from a second provider that is providing the program content;

measuring a quality of the second broadcast while continuing to process and provide the program content of the first broadcast;

storing a measurement of the quality of the second broadcast in the database;

comparing the quality of the second broadcast with a quality of the first broadcast;

if a result of comparing is indicative of the second quality being better than the first quality, switching to the second broadcast in order to receive, by the mobile radio receiver, the program content from the second provider, wherein the mobile receiver comprises two independent tuners, wherein a first tuner of the two independent tuners receives and processes the program content while a second tuner of the two independent tuners receives and measures the quality of the second broadcast.

17. The method in accordance with claim 16, wherein:

program content is provided by the first provider via a wireless access point; and program content is provided by the second provider via a second wireless access point.

18. The method in accordance with claim 16, wherein quality comprises at least one of a determination of signal strength of the broadcast program content, a determination of signal to noise ratio of the broadcast program content, a determination of distortion of the broadcast program content, a determination of carrier to noise ratio of the broadcast program content, and an amplitude measurement in a bandwidth of interest of the broadcast program content.

19. The method in accordance with claim 16, wherein comparing comprises comparing at least one of:

a signal strength of the broadcast program content to a threshold value of signal strength;

a signal to noise ratio of the broadcast program content to a threshold value of signal to noise ratio;

a measure of distortion of the broadcast program content to a threshold value of a measure of distortion; and a signal amplitude of the broadcast program content to a threshold value of signal amplitude.

20. The method in accordance with claim 16, wherein receiving the metadata comprises receiving a subcarrier signal comprising the metadata.

* * * * *